US012562470B2

(12) United States Patent
Wu et al.

(10) Patent No.: US 12,562,470 B2
(45) Date of Patent: Feb. 24, 2026

(54) COMMUNICATION DEVICE

(71) Applicant: HTC Corporation, Taoyuan (TW)

(72) Inventors: Chun-Yih Wu, Taoyuan (TW); Ta-Chun Pu, Taoyuan (TW); Yen-Liang Kuo, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 380 days.

(21) Appl. No.: 18/175,151

(22) Filed: Feb. 27, 2023

(65) Prior Publication Data

US 2024/0243467 A1 Jul. 18, 2024

(30) Foreign Application Priority Data

Jan. 18, 2023 (TW) ................................ 112102288

(51) Int. Cl.
*H01Q 3/01* (2006.01)
*H01Q 13/24* (2006.01)
*H01Q 19/10* (2006.01)

(52) U.S. Cl.
CPC ............... *H01Q 3/01* (2013.01); *H01Q 13/24* (2013.01); *H01Q 19/10* (2013.01)

(58) Field of Classification Search
CPC ........... H01Q 3/01; H01Q 13/24; H01Q 19/10
See application file for complete search history.

(56) References Cited

U.S. PATENT DOCUMENTS

| | | | | |
|---|---|---|---|---|
| 5,883,603 | A * | 3/1999 | Kim | H01Q 13/28 343/785 |
| 7,012,572 | B1 * | 3/2006 | Schaffner | H01Q 13/24 343/785 |
| 2003/0020564 | A1 * | 1/2003 | Nishimura | H03H 9/0207 333/187 |
| 2019/0074578 | A1 * | 3/2019 | Franzi | H03H 9/25 |

FOREIGN PATENT DOCUMENTS

| | | | |
|---|---|---|---|
| CN | 115036684 | A | 9/2022 |
| TW | 202044665 | A | 12/2020 |

OTHER PUBLICATIONS

X. Yu, G. Wu, W. Cao, S. Li, G. Huang and X. Niu, "Ka band small dual reflector antenna fed by dielectric rod antenna," 2016 11th International Symposium on Antennas, Propagation and EM Theory (ISAPE), Guilin, China, 2016, pp. 58-59, doi: 10.1109/ISAPE.2016.7833874. (Year: 2016).*

* cited by examiner

*Primary Examiner* — Amal Patel
(74) *Attorney, Agent, or Firm* — Birch, Stewart, Kolasch & Birch, LLP

(57) ABSTRACT

A communication device includes a signal source, a connection element, an antenna element, a piezoelectric element, a controller, and a reflector. The signal source generates an RF (Radio Frequency) signal. The antenna element is coupled through the connection element to the signal source. The antenna element generates a wireless signal according to the RF signal. The piezoelectric element adjusts (Continued)

the antenna element according to a control signal. The controller generates the control signal. The reflector is configured to reflect the wireless signal.

19 Claims, 3 Drawing Sheets

COMMUNICATION DEVICE

CROSS REFERENCE TO RELATED APPLICATIONS

This application claims priority of Taiwan Patent Application No. 112102288 filed on Jan. 18, 2023, the entirety of which is incorporated by reference herein.

BACKGROUND OF THE INVENTION

Field of the Invention

The disclosure generally relates to a communication device, and more particularly, to a communication device with a wide scanning range.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has an insufficient scanning range, it may degrade the overall communication quality. Accordingly, it has become a critical challenge for designers to design a small-size antenna element that has a wide scanning range and is integrated with a communication device.

BRIEF SUMMARY OF THE INVENTION

In an exemplary embodiment, the invention is directed to a communication device that includes a signal source, a connection element, an antenna element, a piezoelectric element, a controller, and a reflector. The signal source generates an RF (Radio Frequency) signal. The antenna element is coupled through the connection element to the signal source. The antenna element generates a wireless signal according to the RF signal. The piezoelectric element adjusts the antenna element according to a control signal. The controller generates a control signal. The reflector is configured to reflect the wireless signal.

In some embodiments, when the shape of the piezoelectric element is changed, the radiation direction of the antenna element is adjusted.

In some embodiments, the antenna element covers an operational frequency band from 50 GHz to 500 GHz.

In some embodiments, the signal source is an RF transceiver.

In some embodiments, the connection element includes a mode transformer and a PCB (Printed Circuit Board). The mode transformer converts the RF signal into a waveguide signal. The mode transformer is coupled through the PCB to the signal source.

In some embodiments, the antenna element includes a dielectric waveguide configured to transmit the waveguide signal.

In some embodiments, the dielectric waveguide substantially has a cylindrical shape.

In some embodiments, the antenna element further includes a dielectric radiator coupled to the dielectric waveguide. The dielectric radiator generates a wireless signal according to the waveguide signal.

In some embodiments, the dielectric radiator substantially has a tapered shape.

In some embodiments, the average radius of the dielectric radiator is smaller than the average radius of the dielectric waveguide.

In some embodiments, the length of the dielectric radiator is from 5 to 10 wavelengths of the operational frequency band.

In some embodiments, the piezoelectric element includes a piezoelectric tube surrounding at least one portion of the dielectric waveguide.

In some embodiments, the shape of the piezoelectric tube is adjusted according to the control signal.

In some embodiments, the piezoelectric element further includes a plurality of electrodes disposed on the piezoelectric tube. The electrodes are configured to receive the control signal.

In some embodiments, the total number of the electrodes is at least 4.

In some embodiments, the reflector is implemented with a convex mirror.

In some embodiments, the reflector is implemented with a Metasurface.

In some embodiments, the average radius of the dielectric waveguide is from 0.2 to 0.4 wavelength of the operational frequency band.

In some embodiments, the length of the dielectric waveguide is from 10 mm to 30 mm.

In some embodiments, the length of the dielectric radiator is from 3 mm to 9 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
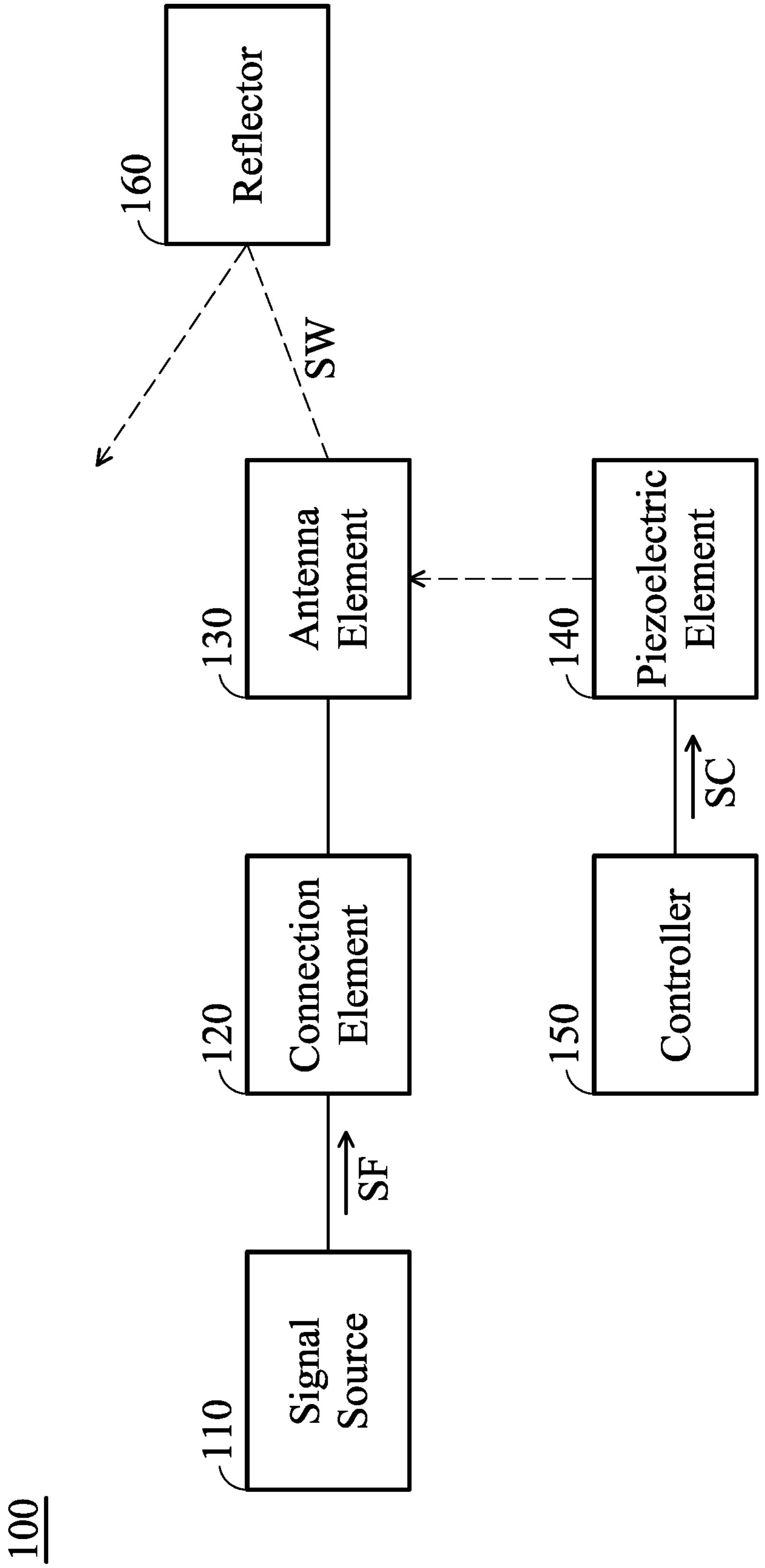
FIG. 1 is a diagram of a communication device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. For example, the communication device 100 may be a wireless access point, a wearable device, a smart phone, a tablet computer, or a notebook computer. Alternatively, the communication device 100 may be any unit operating within the Internet of Things (IOT), but it is not limited thereto.

In the embodiment of FIG. 1, the communication device 100 includes a signal source 110, a connection element 120, an antenna element 130, a piezoelectric element 140, a controller 150, and a reflector 160. It should be noted that the communication device 100 may further include other components, such as a processor, a touch control panel, a speaker, and/or a housing, although they are not displayed in FIG. 1.

The signal source 110 is configured to generate an RF (Radio Frequency) signal SF. For example, the signal source 110 may be an RF module for exciting the antenna element 130.

The antenna element 130 is coupled through the connection element 120 to the signal source 110. The antenna element 130 can generate a wireless signal SW according to the RF signal SF. The shape and type of the antenna element 130 are not limited in the invention. For example, the antenna element 130 may be a waveguide antenna, a monopole antenna, a dipole antenna, a loop antenna, a patch antenna, or a PIFA (Planar Inverted F Antenna), but it is not limited thereto.

In some embodiments, the antenna element 130 can cover an operational frequency band from 50 GHz to 500 GHz, so as to support the wideband operation of mmWave (Millimeter Wave). However, the invention is not limited thereto. In alternative embodiments, the antenna element 130 can also support the wideband operation of THz (Terahertz).

The piezoelectric element 140 can physically adjust the antenna element 130 according to a control signal SC. The controller 150 can generate the control signal SC. For example, the controller 150 can generate the aforementioned control signal SC according to a user input or a processor command, but it is not limited thereto. In some embodiments, when the shape of the piezoelectric element 140 is changed, it physically affects the antenna element 130, such that the radiation direction of the antenna element 130 is adjusted.

The reflector 160 is configured to reflect the wireless signal SW from the antenna element 130. In some embodiments, the reflector 160 is implemented with a convex mirror. In alternative embodiments, the reflector 160 is implemented with a Metasurface, but it is not limited thereto.

With such a design, the radiation direction of the antenna element 130 is adjustable according the different requirements. The incorporation of the reflector 160 can further increase the scanning range of the antenna element 130. Therefore, the proposed communication device 100 can transmit or receive different signals in a variety of directions, so as to enhance the overall communication quality.

The following embodiments will introduce different configurations and detailed structural features of the communication device 100. It should be understood that these figures and descriptions are merely exemplary, rather than limitations of the invention.

Figure 2:
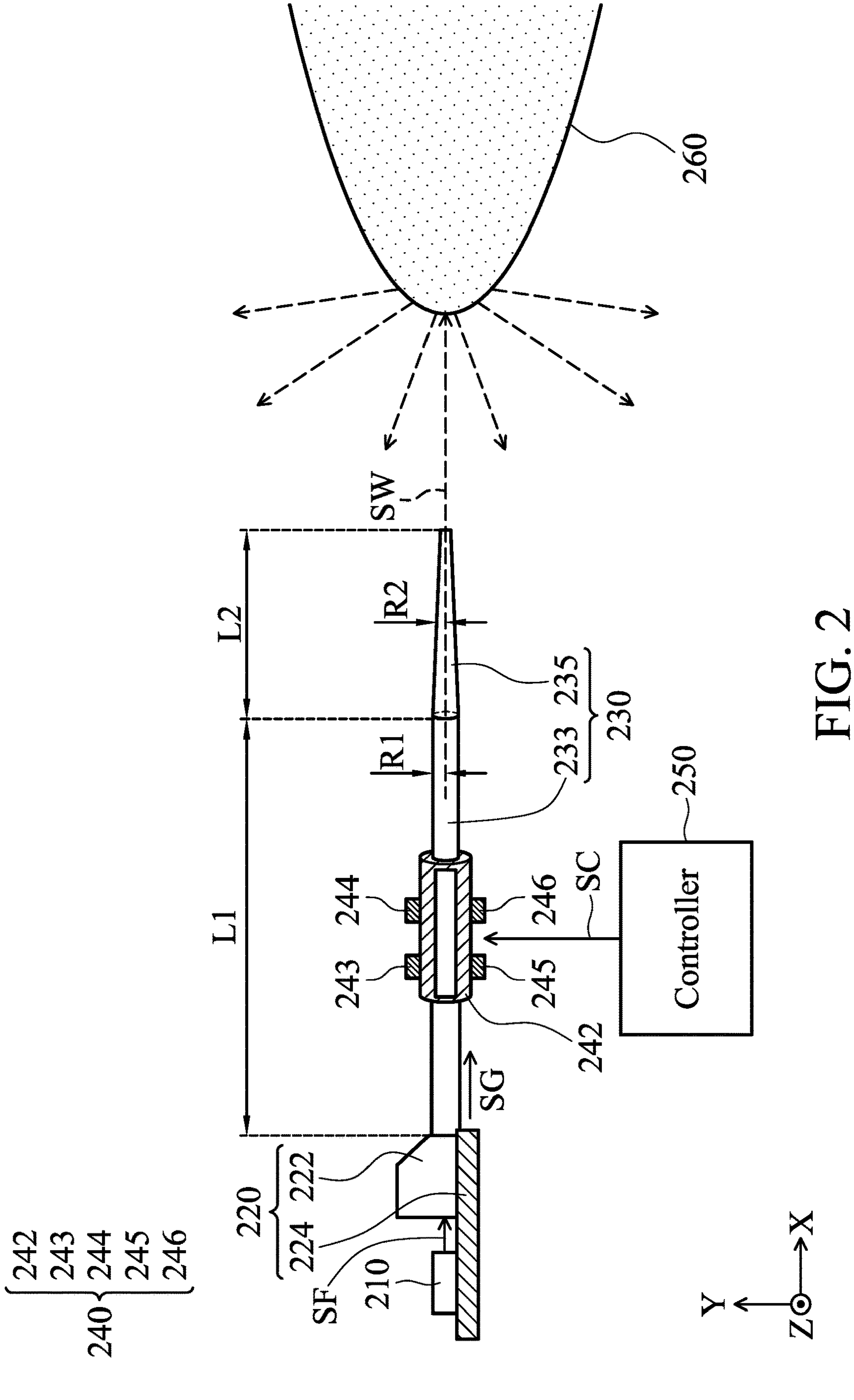
FIG. 2 is a diagram of a communication device according to an embodiment of the invention.

FIG. 2 is a diagram of a communication device 200 according to an embodiment of the invention. FIG. 2 is similar to FIG. 1. In the embodiment of FIG. 2, the communication device 200 includes a signal source 210, a connection element 220, an antenna element 230, a piezoelectric element 240, a controller 250, and a reflector 260.

The signal source 210 is configured to generate an RF signal SF. For example, the signal source 210 may be an RF transceiver, but it is not limited thereto.

The connection element 220 includes a mode transformer 222 and a PCB (Printed Circuit Board) 224. The mode transformer 222 is coupled through the PCB 224 to the signal source 210. The mode transformer 222 can convert the RF signal SF into a waveguide signal SG. In some embodiments, the signal source 210 and the mode transformer 222 are disposed on the same surface of the PCB 224.

In some embodiments, the antenna element 230 can cover an operational frequency band, so as to support the wideband operation of mmWave or THz, but it is not limited thereto.

The antenna element 230 includes a dielectric waveguide 233 and a dielectric radiator 235, which are made of nonconductive materials, such as HDPE (High Density Polyethylene). For example, the dielectric waveguide 233 may substantially have a cylindrical shape. The dielectric waveguide 233 is coupled to the mode transformer 222. The dielectric waveguide 233 is configured to transmit the waveguide signal SG. For example, the dielectric radiator 235 may substantially have a tapered shape or a conical shape. The dielectric radiator 235 is coupled to the dielectric waveguide 233. The dielectric radiator 235 generates a wireless signal SW according to the waveguide signal SG. It should be understood that the shapes of the dielectric waveguide 233 and the dielectric radiator 235 are merely exemplary. In other embodiments, they are adjustable according to different requirements.

In some embodiments, the dielectric waveguide 233 and the dielectric radiator 235 of the antenna element 230 have the same dielectric constant. The aforementioned dielectric constant may be from 1.5 to 3, such as about 2.1. In some embodiments, the average radius R2 of the dielectric radiator 235 is smaller than the average radius R1 of the dielectric waveguide 233. For example, the average radius R1 may be at least twice the average radius R2. In some embodiments, the average radius R1 of the dielectric waveguide 233 is from 0.2 to 0.4 wavelength (0.2λ~0.4λ) of the operational frequency band of the antenna element 230, such as about 0.3 wavelength (0.3λ). In some embodiments, the length L2 of the dielectric radiator 235 (along the direction of X-axis) is from 5 to 10 wavelengths (5λ~10λ) of the operational frequency band of the antenna element 230. In alternative embodiments, the length L1 of the dielectric waveguide 233 (along the direction of X-axis) is from 10 mm to 30 mm (e.g., about 20 mm), and the length L2 of the dielectric radiator 235 is from 3 mm to 9 mm (e.g., about 6 mm). The above ranges of element sizes are calculated and obtained according to many experiment results, and they help to optimize the operational bandwidth and impedance matching of the antenna element 230 of the communication device 200.

The piezoelectric element 240 includes a piezoelectric tube 242 and a plurality of electrodes 243, 244, 245 and 246. The piezoelectric tube 242 surrounds at least one portion of the dielectric waveguide 233. The electrodes 243, 244, 245 and 246 are disposed on the piezoelectric tube 242. The electrodes 243, 244, 245 and 246 are configured to receive a control signal SC from the controller 250. The arrangements of the electrodes 243, 244, 245 and 246 are not limited in the invention. In some embodiments, the total number of electrodes 243, 244, 245 and 246 is at least 4. In alternative embodiments, the piezoelectric tube 240 includes more electrodes (not shown). In addition, the piezoelectric tube 242 may directly or indirectly touch the dielectric waveguide 233, and the shape of the piezoelectric tube 242 can be adjusted according to the control signal SC.

It should be noted that when the shape of the piezoelectric tube 242 is changed, the central axis of the dielectric waveguide 233 may deflect (e.g., toward the direction of +Y-axis or −Y-axis), and the radiation direction of the dielectric radiator 235 can be correspondingly adjusted.

The reflector 260 can reflect the wireless signal SW from the antenna element 230. When the wireless signal SW is transmitted to different positions on the reflector 260, is can generate corresponding reflected signals in a variety of directions (multiple dashed arrows as shown in FIG. 2). According to practical measurements, if both the piezoelectric element 240 and the reflector 260 are used, the scanning range of the antenna element 230 can be significantly improved. Furthermore, the total manufacturing cost of the communication device 200 can be effectively reduced because the proposed communication device 200 does not need to use additional phase shifters or other active elements.

Figure 3:
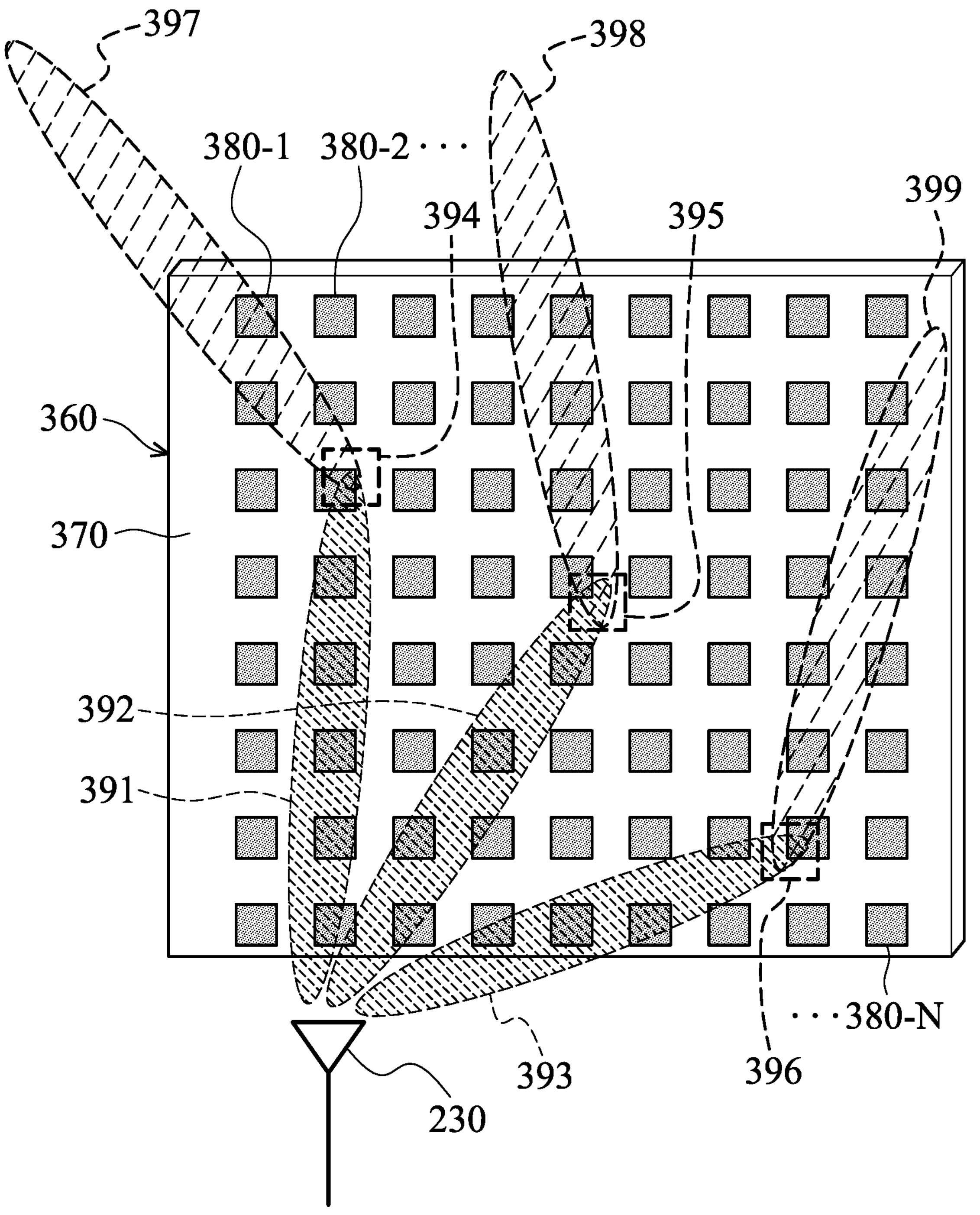
FIG. 3 is a diagram of a reflector according to an embodiment of the invention.

FIG. 3 is a diagram of a reflector 360 according to an embodiment of the invention. Please refer to FIG. 2 and FIG. 3 together. In the embodiment of FIG. 3, the reflector 360 includes a dielectric substrate 370 and a plurality of metal pieces 380-1, 380-2, . . . , and 380-N, where "N" is any positive integer greater than or equal to 4. In addition, the metal pieces 380-1, 380-2, . . . , and 380-N are all disposed on the same surface of the dielectric substrate 370. In some embodiments, a uniform array is formed by the metal pieces 380-1, 380-2, . . . , and 380-N. However, the invention is not limited thereto. In alternative embodiments, a non-uniform array is formed by the metal pieces 380-1, 380-2, . . . , and 380-N.

In some embodiments, if a first incident beam 391 of the antenna element 230 is aimed at a first position 394 on the reflector 360, the reflector 360 will correspondingly generate a first reflected beam 397. In alternative embodiments, if a second incident beam 392 of the antenna element 230 is aimed at a second position 395 on the reflector 360, the reflector 360 will correspondingly generate a second reflected beam 398. In other embodiments, if a third incident beam 393 of the antenna element 230 is aimed at a third position 396 on the reflector 360, the reflector 360 will correspondingly generate a third reflected beam 399. In conclusion, the antenna element 230 used together with the reflector 360 can provide a relatively wide scanning range.

The invention proposes a novel communication device. In comparison to the conventional design, the invention has at least the advantages of wide scanning range and low manufacturing cost. Therefore, the invention is suitable for application in a variety of devices.

Note that the above element sizes are not limitations of the invention. A designer can fine-tune these settings or values in order to meet different requirements. It should be understood that the communication device of the invention is not limited to the configurations depicted in FIGS. 1-3. The invention may merely include any one or more features of any one or more embodiments of FIGS. 1-3. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:

a signal source, generating an RF signal;

a connection element;

an antenna element, coupled through the connection element to the signal source, wherein the antenna element generates a wireless signal according to the RF signal;

a piezoelectric element, adjusting the antenna element according to a control signal;

a controller, generating the control signal; and a reflector, reflecting the wireless signal, wherein the antenna element comprises a dielectric waveguide, and wherein the piezoelectric element comprises a piezoelectric tube for surrounding at least one portion of the dielectric waveguide.

2. The communication device as claimed in claim 1, wherein when a shape of the piezoelectric element is changed, a radiation direction of the antenna element is adjusted.

3. The communication device as claimed in claim 1, wherein the antenna element covers an operational frequency band from 50 GHz to 500 GHz.

4. The communication device as claimed in claim 1, wherein the signal source is an RF transceiver.

5. The communication device as claimed in claim 3, wherein the connection element comprises:

a mode transformer, converting the RF signal into a waveguide signal; and a PCB, wherein the mode transformer is coupled through the PCB to the signal source.

6. The communication device as claimed in claim 5, wherein the dielectric waveguide is configured to transmit the waveguide signal.

7. The communication device as claimed in claim 6, wherein the dielectric waveguide substantially has a cylindrical shape.

8. The communication device as claimed in claim 6, wherein the antenna element further comprises:

a dielectric radiator, coupled to the dielectric waveguide, wherein the dielectric radiator generates the wireless signal according to the waveguide signal.

9. The communication device as claimed in claim 8, wherein the dielectric radiator substantially has a tapered shape.

10. The communication device as claimed in claim 8, wherein an average radius of the dielectric radiator is smaller than that of the dielectric waveguide.

11. The communication device as claimed in claim 8, wherein a length of the dielectric radiator is from 5 to 10 wavelengths of the operational frequency band.

12. The communication device as claimed in claim 8, wherein a length of the dielectric radiator is from 3 mm to 9 mm.

13. The communication device as claimed in claim 6, wherein a shape of the piezoelectric tube is adjusted according to the control signal.

14. The communication device as claimed in claim 6, wherein the piezoelectric element further comprises:

a plurality of electrodes, disposed on the piezoelectric tube, wherein the electrodes are configured to receive the control signal.

15. The communication device as claimed in claim 14, wherein a total number of the electrodes is at least 4.

16. The communication device as claimed in claim 6, wherein an average radius of the dielectric waveguide is from 0.2 to 0.4 wavelength of the operational frequency band.

17. The communication device as claimed in claim 6, wherein a length of the dielectric waveguide is from 10 mm to 30 mm.

18. The communication device as claimed in claim 1, wherein the reflector is implemented with a convex mirror.

19. The communication device as claimed in claim 1, wherein the reflector is implemented with a Metasurface.

* * * * *